(12) United States Patent
Ochiai et al.

(10) Patent No.: US 7,845,479 B2
(45) Date of Patent: Dec. 7, 2010

(54) ELECTROMAGNETIC CLUTCH

(75) Inventors: Tomiaki Ochiai, Tochigi (JP); Koji Iizuka, Tochigi (JP); Masayuki Sayama, Tochigi (JP)

(73) Assignee: GKN Driveline Torque Technology KK, Tochigi-Ken (JP)

( * ) Notice: Subject to any disclaimer, the term of this patent is extended or adjusted under 35 U.S.C. 154(b) by 396 days.

(21) Appl. No.: 12/098,675

(22) Filed: Apr. 7, 2008

(65) Prior Publication Data

US 2008/0251344 A1 Oct. 16, 2008

(30) Foreign Application Priority Data

Apr. 12, 2007 (JP) ............................... 2007-104679

(51) Int. Cl.
*F16D 27/115* (2006.01)

(52) U.S. Cl. ...................... 192/35; 192/84.7; 192/84.91; 192/84.96

(58) Field of Classification Search ................. 192/84.7, 192/84.93, 84.96
See application file for complete search history.

(56) References Cited

U.S. PATENT DOCUMENTS 6,837,351 B2 * 1/2005 Showalter et al. ............. 192/35
6,997,294 B2 * 2/2006 Ochiai et al. .................. 192/35

FOREIGN PATENT DOCUMENTS

JP 2000-240684 A 9/2000

OTHER PUBLICATIONS esp@cenet patent abstract for Japanese Publication No. 2000240684, Publication date Sep. 5, 2000 (1 page).

* cited by examiner

*Primary Examiner*—Richard M. Lorence
(74) *Attorney, Agent, or Firm*—Osha Liang LLP

(57) ABSTRACT

An electromagnetic clutch is provided with: a clutch hub which is connected to a shaft member (one of a pair of rotation members); a clutch housing which is connected to a hollow shaft (the other of a pair of rotation members); a rotor which is connected to the clutch housing; a main clutch (clutch member) which is disposed between the clutch hub and the clutch housing; and an electromagnet which operates the main clutch. An end surface of the clutch housing and an end surface of a core of the electromagnet are disposed to be opposed to each other with the rotor interposed therebetween in an axial direction.

The end of the rotor in a side of the clutch housing is formed with an extension portion which extends to the clutch housing in the axial direction. An outer periphery of the clutch housing is connected to the extension portion through a connection portion. The connection portion is disposed outside the main clutch in a radial direction.

8 Claims, 1 Drawing Sheet

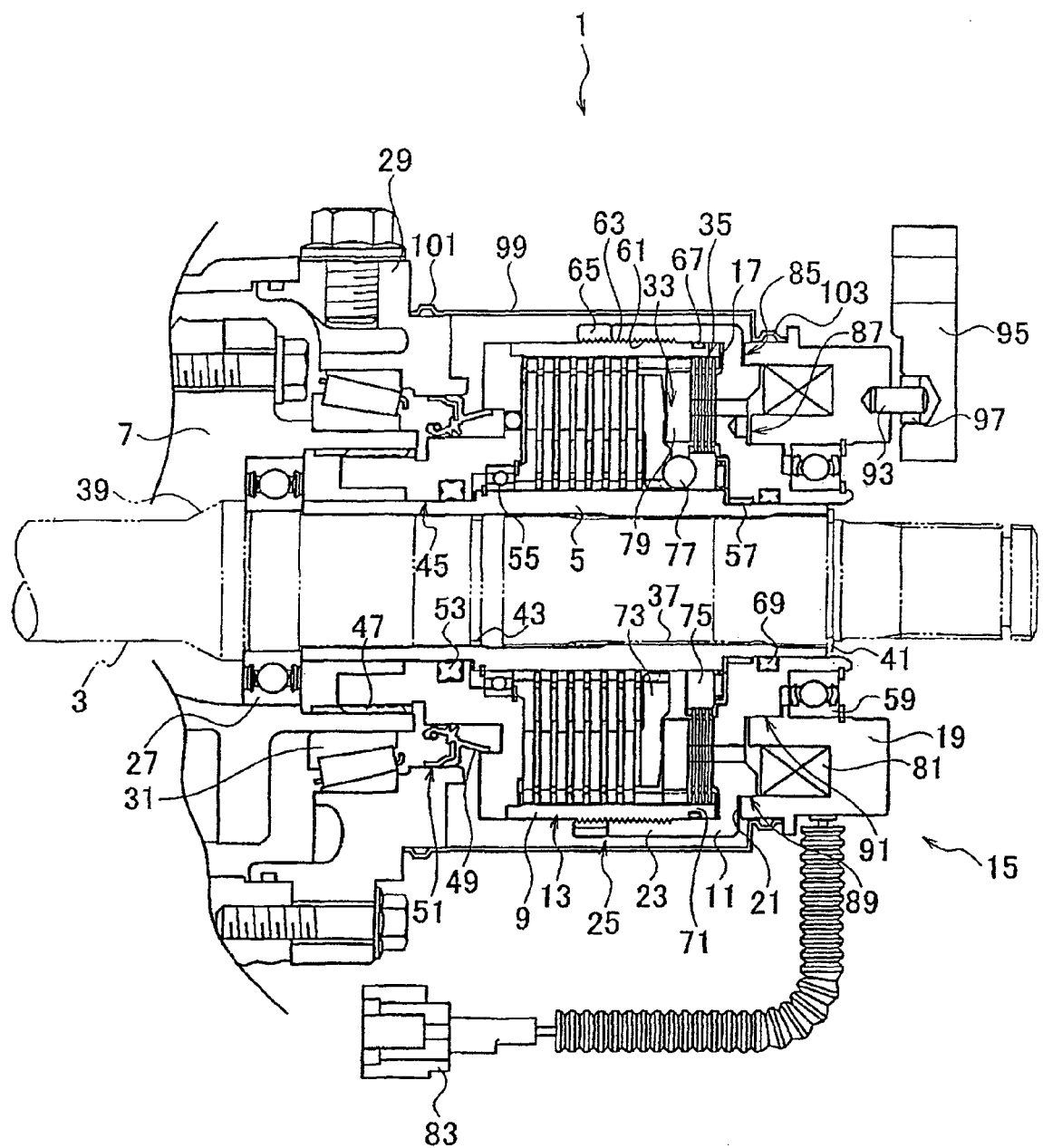

ELECTROMAGNETIC CLUTCH

This application claims foreign priority from Japanese Patent Application No. 2007-104679 filed on Apr. 12, 2007, the entire contents of which are hereby incorporated by reference.

BACKGROUND OF THE INVENTION

1. Field of the Invention

The present invention relates to an electromagnetic clutch used in a vehicle.

2. Related Art

JP-A-2000-240684 discloses a connection device including a main clutch that is operated by an electromagnet to connect a housing with a hub. In the connection device, the housing includes a rear housing and a front housing, and the rear housing is screw-connected to the front housing. When the electromagnet is energized, magnetic lines pass through the front housing to fasten an electromagnetic pilot clutch and to fasten the main clutch, thereby connecting the housing to the hub.

However, in the connection device, the electromagnet is disposed in the inner periphery of the rear housing. Additionally, the connection portion where the rear housing is screw-connected to the front housing is disposed in the outer periphery of a core of the electromagnet. For these reasons, each member protrudes in the radial direction at a position where the electromagnet is disposed, thereby causing an increase in size of the connection device in the radial direction.

SUMMARY OF THE INVENTION

One or more embodiments of the invention provide an electromagnetic clutch designed so as not to protrude in the radial direction.

According to one or more embodiments of the invention, an electromagnetic clutch (1) is provided with: a clutch hub (5) connected to one (3) of a pair of rotation members; a clutch housing (9) connected to the other (7) of the pair of rotation members; a rotor (11) connected to the clutch housing (9); a clutch member (13) disposed between the clutch hub (5) and the clutch housing (9); and an electromagnet (15) that operates the clutch member (13). An end surface (17) of the clutch housing (9) and an end surface (21) of a core (19) of the electromagnet (15) are disposed to be opposed to each other with the rotor (11) interposed therebetween in an axial direction. The rotor (11) has an extension portion (23) extending to the clutch housing in the axial direction at an end of the rotor (11) on in a side of the clutch housing (9). The extension portion (23) is connected to an outer periphery of the clutch housing (9) through a connection portion (25). The connection portion (25) is disposed outside the clutch member (13) in a radial direction.

In the electromagnetic clutch (1), an air gap (85, 87, 89, 91) through which magnetic lines of the electromagnet (15) pass may be disposed between an inner periphery or the end surface (21) of the core (19) of the electromagnet (15) and the rotor (11).

In the electromagnetic clutch (1), the connection portion (25) may be configured by screw-connecting a screw portion (61) formed in the extension portion (23) to a screw portion (63) formed in the outer periphery of the clutch housing (9).

In the electromagnetic clutch (1), a screw member (65) may be disposed at a front end of the extension portion (23).

In the electromagnetic clutch (1), a seal member (67) may be disposed between the rotor (11) and an outer peripheral portion of the end surface (17) of the clutch housing (9).

In the electromagnetic clutch (1), a pilot clutch (35) configured to be operated by the electromagnet (15) may be disposed in a position where the seal member (67) is disposed in the clutch housing (9).

In the electromagnetic clutch (1), the electromagnet (15) may include an electromagnetic coil (81), the core (19) may have an opening in one side of the core (19) in the axial direction which opens to a side of the clutch member 13, and the electromagnet coil (81) may be surrounded by the core (19) on inner and outer sides of the electromagnet coil (81) in a radial direction and on the other side of the core (19) in the axial direction.

In the electromagnetic clutch, since the end surface of the clutch housing and the end surface of the core of the electromagnet are disposed so as to be opposed to each other with the rotor interposed therebetween in the axial direction, the members do not protrude in the radial direction. Additionally, since the extension portion is formed in the rotor, and the connection portion between the clutch housing and the rotor is disposed outside the clutch member in the radial direction, the length of the clutch housing is not changed in the axial direction.

Accordingly, it is possible to prevent the electromagnetic clutch from protruding in the radial direction without changing the length of the clutch housing in the axial direction.

If the air gap through which magnetic lines of the electromagnet pass is disposed between the inner periphery or the end surface of the core of the electromagnet and the rotor, it is not necessary to provide the air gap in the outer periphery of the core of the electromagnet. Additionally, it is possible to prevent the protrusion thereof from protruding in the radial direction.

If the connection portion is configured by screw-connecting the screw portion formed in the extension portion to the screw portion formed in the outer periphery of the clutch housing, and the extension portion has the screw member at the front end thereof, it is possible to securely connect the connection portion by a double-nut function.

If the seal member is disposed between the rotor and the outer peripheral portion of the end surface of the clutch housing, it is possible to prevent an alien substance from entering from the connection portion into the clutch housing.

If the pilot clutch which is operated by the electromagnet is disposed in a position where the seal member is disposed in the clutch housing, it is possible to prevent dust from entering the pilot clutch, thereby maintaining an intermittent characteristic of the pilot clutch.

Other aspects and advantages of the invention will be apparent from the following description, the drawings and the claims.

BRIEF DESCRIPTION OF THE DRAWINGS

The FIGURE is a sectional view of an electromagnetic clutch according to an exemplary embodiment.

DETAILED DESCRIPTION OF THE EXEMPLARY EMBODIMENTS

An exemplary embodiment of the invention will be described with reference to the FIGURE.

An electromagnetic clutch 1 according to the exemplary embodiment includes a clutch hub 5 which is connected to a shaft member 3 (one of a pair of rotation members); a clutch housing 9 which is connected to a hollow shaft 7 (the other of the pair of rotation members); a rotor 11 which is connected to the clutch housing 9; a main clutch 13 (clutch member) which is disposed between the clutch hub 5 and the clutch housing 9; and an electromagnet 15 which operates the main clutch 13. Then, an end surface 17 of the clutch housing 9 and an end surface 21 of a core 19 of the electromagnet 15 are disposed to be opposed to each other with the rotor 11 interposed therebetween in an axial direction. The end of the rotor 11 close to the clutch housing 9 configures an extension portion 23 which extends to the clutch housing 9 in the axial direction. The outer peripheral portions of the clutch housing 9 and the extension portion 23 are connected by a connection portion 25, and the connection portion 25 is disposed outside the main clutch 13 in a radial direction.

The shaft member 3 is connected to, for example, one of a pair of output members of a differential mechanism including a differential member, a pair of output shafts, and a differential case, and the hollow shaft 7 is connected to the a differential case. Additionally, the shaft member 3 is inserted through the hollow shaft 7 to be supported by a bearing 27 in the inner periphery of the hollow shaft 7, and the hollow shaft 7 is received in a case 29 to be supported by a bearing 31 of the case 29. Further, the differential mechanism connecting the shaft member 3 to the hollow shaft 7 is actuated by the electromagnetic clutch 1.

As shown in the FIGURE, the electromagnetic clutch 1 includes the clutch hub 5, the clutch housing 9, the rotor 11, the main clutch 13, a cam mechanism 33, and a pilot clutch 35, and is operated by the electromagnet 15.

The clutch hub 5 is spline-connected to the shaft member 3 through a spline portion 37 formed in the inner periphery thereof to rotate together with the shaft member 3. One end of the clutch hub 5 is disposed at a flange portion 39 of the shaft member 3 in the axial direction through the bearing 27. Additionally, the other end thereof is positioned in the axial direction by a snap ring 41 serving as a retaining ring, which is fixed to the shaft member 3, so as not to come out from the other end of the clutch hub 5. An O-ring 43 is disposed between the clutch hub 5 and the shaft member 3. The clutch housing 9 and the rotor 11 are supported at the outer periphery of the clutch hub 5.

The clutch housing 9 is supported by a support portion 45 in the outer periphery of one end of the clutch hub 5. The clutch housing 9 is spline-connected to the inner periphery of a cylinder portion disposed in the end of the hollow shaft 7 through a spline portion 47 which is formed in the outer periphery of one end in the axial direction to rotate together with the hollow shaft 7. Additionally, the spline portion 47 is disposed in the inner periphery of a bearing 31, and the bearing 27 is disposed to be closely opposed to one end of the spline portion 47 in the axial direction, thereby saving a space. A seal 51 having a lip portion 49 is disposed between the clutch housing 9 and a case 29. The lip portion 49 comes in contact with the outer peripheral surface of an annular portion formed in the clutch housing 9. The lip portion 49 may come in contact with the inner peripheral surface of the annular portion. An X-ring 53 is disposed between the clutch housing 9 and the clutch hub 5, and a predetermined amount of lubricant oil suitable for the main clutch 13 is filled in a chamber surrounded by the clutch housing 9 and the clutch hub 5. Further, a pair of bearings 55 and 57 are disposed between the clutch hub 5, the clutch housing 9, and the rotor 11 so as to support the clutch hub 5, the clutch housing 9, and the rotor 11.

The rotor 11 is supported by the bearing 57 at the other end of the clutch hub 5, and supports the electromagnet 15 through a seal bearing 59. The end of the rotor 11 close to the clutch housing 9 configures the extension portion 23 which extends to the clutch housing 9 in the axial direction. A screw portion 61 is formed in the inner periphery of the extension portion 23, and the screw portion 61 is screw-connected to a screw portion 63 which is formed in the outer periphery of the clutch housing 9. Additionally, a screw member 65 is screw-connected to the end of the screw portion 63 of the clutch housing 9. Those screw portions 61 and 63 and the screw member 65 configure the connection portion 25.

The connection portion 25 is disposed at the outside in the radial direction of the main clutch housing 13 which is received in the clutch housing 9. The connection portion 25 fixes the rotor 11 to the clutch housing 9 by double-nut function. Since the connection portion 25 is disposed not in the electromagnet 15 at the end of the clutch housing 9, but in the outer periphery of the main clutch 13, the connection portion 25 is prevented from protruding from the electromagnet 15, thereby realizing a compact in size in the axial direction. An O-ring 67 (seal member) is disposed between the rotor 11 and the outer peripheral portion of the end surface 17 of the clutch housing 9, and an X-ring 69 is disposed between the rotor 11 and the clutch hub 5. The O-ring 67 is disposed at the outside in the radial direction of the pilot clutch 35 which is received in the clutch housing 9. The O-ring 67 is disposed in an arrangement concave portion on the outer peripheral portion at a side of the end surface 17 of the clutch housing 9. By forming the arrangement concave portion for the O-ring 67, a thickness of an end 71 of the clutch housing 9 is reduced. Thus, the leakage of the magnetic lines is reduced.

The main clutch 13, the cam mechanism 33, and the pilot clutch 35 are disposed between the clutch hub 5, the clutch housing 9, and the rotor 11.

The main clutch 13 includes a plurality of clutch plates which are connected to the outer periphery of the clutch housing 5 and the inner periphery of the steel clutch housing 9. When the fastening operation of the main clutch 13 is carried out, the connection between the clutch hub 5 and the clutch housing 9, that is, the connection between the shaft member 3 and the hollow shaft 7 is carried out. The fastening operation of the main clutch 13 is carried out by a cam thrust force which is generated from the cam mechanism 33.

The cam mechanism 33 includes a pressure plate 73, a cam ring 75, and a cam ball 77. The pressure plate 73 is movably connected to the outer periphery of the clutch hub 5 in the axial direction. The cam ring 75 is supported at the outer periphery of the of the clutch hub 5 to be movable in the axial direction, and a needle bearing for receiving a thrust force of the cam ring 75 is disposed in the rear surface thereof. The clutch plate of the pilot clutch 35 is connected to the outer periphery of the cam ring 75.

The cam ball 77 is disposed between the pressure plate 73 and the cam ring 75, and moves the pressure plate 73 and the cam ring 75 in the axial direction when a differential rotation occurs between the pressure plate 73 and the cam ring 75. The fastening operation of the main clutch 13 is carried out by the movement of the pressure plate 73. The cam thrust force of the cam mechanism 33 is generated by the pilot clutch 35.

The pilot clutch 35 includes a plurality of clutch plates, which are connected to the outer periphery of the cam ring 75 and the inner periphery of the clutch housing 9, and an armature 79 which is connected to the inner periphery of the clutch housing 9. The pilot clutch 35 forms a magnetic flux loop by energizing the electromagnet 15 so that the magnetic lines circulate through the core 19, the rotor 11, the pilot clutch 35, and the armature 79. Also, the fastening operation of the pilot clutch 35 is carried out by moving the armature 79 in a direction where the fastening operation of the pilot clutch 35 is carried out, and the pilot clutch 35 generates a differential rotation between the pressure plate 73 and the cam ring 75. The magnetic lines slightly leaking from the pilot clutch 35 to the clutch housing 9 are narrowed by the thin end 71 at the inner periphery of the concave portion in which in the O-ring 67 is disposed, thereby preventing the leakage of the magnetic lines. Additionally, by the O-ring 67 disposed outside the pilot clutch 35 in the diameter direction, dust etc. are prevented from entering the pilot clutch 35.

The electromagnet 15 includes an electromagnetic coil 81 and the core 19, and is disposed in the other end of the shaft member 3. The core 19 has an opening in one side of the core 19 in the axial direction which opens to a side of the clutch member 13, and the electromagnet coil 81 is surrounded by the core 19 on inner and outer sides of the electromagnet coil 81 in a radial direction and on the other side of the core 19 in the axial direction. The core 19 is connected to a connector 83 which is connected to a controller (not shown) for controlling the energization to the electromagnet 15. The fastening operation of the pilot clutch 35 is carried out by the energization to the electromagnet 15. Additionally, air gaps 85 and 87 are disposed between the rotor 11 and the end surface 21 of the core 19 in the axial direction, and air gaps 89 and 91 are disposed between the rotor 11 and the inner periphery of the core 19 in the diameter direction. The air gaps 85, 87, 89, and 91 form a magnetic flux loop of the magnetic lines by energizing the electromagnet 15 to operate the main clutch 13. Further, a connection member 93 is fixed to the core 19, and the core 19 is supported in a rotation direction by a support member 95 which is disposed closer in the other end of the shaft member 3 than the electromagnet 15.

The support member 95 is fixed to a static system such as an engine and an electric motor serving as a driving source, a vehicle, and a vehicle frame. An elastic member 97 is disposed between the support member 95 and the connection portion 93 fixed to the electromagnet 15. The elastic member 97 is formed of an elastic material such as rubber so as to be formed in a ring shape, and is disposed in the concave portion formed in the support member 95. The elastic member 97 absorbs vibrations in the radial direction and the rotation direction of the static system to restrict vibration propagation from the static system to the electromagnet 15. Additionally, the connection member 93 serves as a baffle of the electromagnet 15. Also, the connection member 93 absorbs vibration in the axial direction, and allows the electromagnet 15 and the elastic member 97 to relatively move in the axial direction. The elastic member may be provided in a fixed portion of the support member 95 and the static system. In this case, it is possible to further absorb vibration from the static system.

A cover 99 for covering the clutch housing 9 and the rotor 11 is disposed between the case 29 and the electromagnet 15. The cover 99 is formed in a thin cylindrical shape, and seal members 101 and 103 are disposed at both ends thereof between the case 29 and the core 19. The seal members 101 and 103 prevent dust from entering an air space which is formed between the cover 99, the clutch housing 9, and the rotor 11. It is possible to protect operation members such as the cam mechanism 33, the pilot clutch 35, and the air gaps 85, 87, 89, and 91 by performing a dust proofing to the air space. In particular, it is possible to prevent the magnetic flux loop from not being formed due to dust entering the air gaps 85, 87, 89, and 91. Additionally, a part of the core 19 is exposed to the outside from the cover 99. Accordingly, the radiation and cooling performances of the electromagnet 15 are improved.

In the electromagnetic clutch 1 with such a configuration, since the end surface 17 of the clutch housing 9 and the end surface 21 of the core 19 of the electromagnet 15 are disposed with the rotor 11 interposed therebetween in the axial direction, the members do not protrude in the radial direction. Additionally, since the extension portion 23 is formed in the rotor 11, and the connection portion 25 between the clutch housing 9 and the rotor 11 is disposed outside the main clutch 13 in the radial direction, the length of the clutch housing 9 is not changed in the axial direction.

Accordingly, it is possible to prevent the electromagnetic clutch 1 from protruding in the radial direction without changing the length of the clutch housing 9 in the axial direction.

Since the air gaps 85, 87, 89, and 91 are disposed between the inner periphery or the end surface 21 of the core 19 of the electromagnet 15 and the rotor 11, it is not necessary to provide an air gap at the outside of the core 19 of the electromagnet 15. Additionally, it is possible to prevent the protrusion thereof in the radial direction.

Since the connection portion 25 is formed in the manner that the screw portion 61 formed in the extension portion 23 is screw-connected to the screw portion 63 formed in the outer periphery of the clutch housing 9, and the extension portion 23 has the screw member 65 at the front end thereof, thereby securely fixing the connection portion 25 by double-nut function.

Since the O-ring 67 is disposed between the rotor 11 and the outer peripheral portion of the end surface 17 of the clutch housing 9, it is possible to prevent an alien substance from entering from the connection portion 25 into the clutch housing 9.

Since the pilot clutch 35, which is operated by the electromagnet 15, is disposed in a position where the O-ring 67 is disposed in the clutch housing 9, it is possible to prevent dust entering the pilot clutch 35, thereby maintaining an intermittent characteristic of the pilot clutch 35.

In the electromagnetic clutch according to the embodiment, a differential restriction of the differential mechanism is carried out, but the electromagnetic clutch may be used as an intermittent device for intermitting torque between a pair of rotation members.

While description has been made in connection with a specific exemplary embodiment of the invention, it will be obvious to those skilled in the art that various changes and modification may be made therein without departing from the present invention. It is aimed, therefore, to cover in the appended claims all such changes and modifications falling within the true spirit and scope of the present invention.

BRIEF DESCRIPTION OF REFERENCE NUMERALS AND SIGNS

1: ELECTROMAGNETIC CLUTCH
3: SHAFT MEMBER (ONE OF A PAIR OF ROTATION MEMBERS)
5: CLUTCH HUB
7: HOLLOW SHAFT (THE OTHER OF A PAIR OF ROTATION MEMBERS)
9: CLUTCH HOUSING
11: ROTOR
13: MAIN CLUTCH (CLUTCH MEMBER)
15: ELECTROMAGNET
17: END SURFACE OF CLUTCH HOUSING
19: CORE
21: END SURFACE OF CORE
23: EXTENSION PORTION

25: CONNECTION PORTION
33: CAM MECHANISM
35: PILOT CLUTCH
61: SCREW PORTION OF EXTENSION PORTION
63: SCREW PORTION OF CLUTCH HOUSING
65: SCREW MEMBER
67: O-RING (SEAL MEMBER)
85, 87, 89, 91: AIR GAP

What is claimed is:

1. An electromagnetic clutch comprising:
a clutch hub connected to one of a pair of rotation members;
a clutch housing connected to the other of the pair of rotation members;
a rotor connected to the clutch housing;
a clutch member disposed between the clutch hub and the clutch housing; and
an electromagnet that operates the clutch member,
wherein an end surface of the clutch housing and an end surface of a core of the electromagnet are disposed to be opposed to each other with the rotor interposed therebetween in an axial direction,
wherein the rotor has an extension portion extending to the clutch housing in the axial direction at an end of the rotor on a side of the clutch housing,
wherein the extension portion is connected to an outer periphery of the clutch housing through a connection portion, and
wherein the connection portion is disposed outside the clutch member in a radial direction.

2. The electromagnetic clutch according to claim 1, wherein an air gap through which magnetic lines of the electromagnet pass is disposed between an inner periphery or the end surface of the core of the electromagnet and the rotor.

3. The electromagnetic clutch according to claim 1, wherein the connection portion is configured by screw-connecting a screw portion formed in the extension portion to a screw portion formed in the outer periphery of the clutch housing.

4. The electromagnetic clutch according to claim 1, further comprising:
a screw member disposed at a front end of the extension portion.

5. The electromagnetic clutch according to claim 1, further comprising:
a seal member disposed between the rotor and an outer peripheral portion of the end surface of the clutch housing.

6. The electromagnetic clutch according to claim 5, further comprising:
a pilot clutch configured to be operated by the electromagnet and disposed in a position where the seal member is disposed in the clutch housing.

7. The electromagnetic clutch according to claim 1, wherein the electromagnet includes an electromagnetic coil, and
wherein the core has an opening in one side of the core in the axial direction which opens to a side of the clutch member, and the electromagnet coil is surrounded by the core on inner and outer sides of the electromagnet coil in a radial direction and on the other side of the core in the axial direction.

8. An electromagnetic clutch comprising:
a clutch hub connected to one of a pair of rotation members;
a clutch housing connected to the other of the pair of rotation members;
a rotor connected to the clutch housing;
a clutch member disposed between the clutch hub and the clutch housing; and
an electromagnet that operates the clutch member,
wherein an end surface of the clutch housing and an end surface of a core of the electromagnet are disposed to be opposed to each other with the rotor interposed therebetween in an axial direction,
wherein the rotor has an extension portion extending to the clutch housing in the axial direction at an end of the rotor on a side of the clutch housing,
wherein the extension portion is connected to an outer periphery of the clutch housing through a connection portion,
wherein the connection portion is disposed outside the clutch member in a radial direction.
wherein an air gap through which magnetic lines of the electromagnet pass is disposed between an inner periphery or the end surface of the core of the electromagnet and the rotor,
wherein the connection portion is configured by screw-connecting a screw portion formed in the extension portion to a screw portion formed in the outer periphery of the clutch housing,
wherein a screw member is disposed at a front end of the extension portion,
wherein a seal member is disposed between the rotor and an outer peripheral portion of the end surface of the clutch housing,
wherein a pilot clutch configured to be operated by the electromagnet is disposed in a position where the seal member is disposed in the clutch housing,
wherein the electromagnet includes an electromagnetic coil, and
wherein the core has an opening in one side of the core in the axial direction which opens to a side of the clutch member, and the electromagnet coil is surrounded by the core on inner and outer sides of the electromagnet coil in a radial direction and on the other side of the core in the axial direction.

* * * * *